United States Patent
Nielsen et al.

(10) Patent No.: US 11,901,734 B2
(45) Date of Patent: Feb. 13, 2024

(54) GRID SIDE INVERTER SYSTEM ARRANGED FOR CONTROLLING CURRENT INJECTION WHEN A PHASE LOCKED LOOP CONTROLLER IS MISALIGNED

(71) Applicant: VESTAS WIND SYSTEMS A/S, Aarhus N. (DK)

(72) Inventors: John Godsk Nielsen, Hornslet (DK); Torsten Lund, Fredericia (DK); Hamid Soltani, Silkeborg (DK); Gert Karmisholt Andersen, Hovedgård (DK)

(73) Assignee: VESTAS WIND SYSTEMS A/S, Aarhus N (DK)

( * ) Notice: Subject to any disclaimer, the term of this patent is extended or adjusted under 35 U.S.C. 154(b) by 0 days.

(21) Appl. No.: 17/832,223

(22) Filed: Jun. 3, 2022

(65) Prior Publication Data
US 2023/0344230 A1 Oct. 26, 2023

(30) Foreign Application Priority Data
Nov. 30, 2021 (DK) .......................... PA 2021 01136

(51) Int. Cl.
*H02J 3/16* (2006.01)
(52) U.S. Cl.
CPC ............ *H02J 3/16* (2013.01); *H02J 2300/28* (2020.01)
(58) Field of Classification Search
CPC .................... H02J 3/16; H02J 2300/28
USPC ........................................... 307/130
See application file for complete search history.

(56) References Cited

U.S. PATENT DOCUMENTS

| 11,362,539 B1 * | 6/2022 | Alam ................. G05B 13/0265 |
| 2017/0141574 A1 | 5/2017 | Jasim |
| 2019/0237972 A1 | 8/2019 | Wang et al. |

FOREIGN PATENT DOCUMENTS

| JP | 2020005415 A | 1/2020 |
| JP | 2020025394 A | 2/2020 |
| JP | 2021141704 A | 9/2021 |
| WO | 2012022353 A2 | 2/2012 |

(Continued)

OTHER PUBLICATIONS

Danish Patent and Trademark Office, First Technical Examination including the Search Report for Application PA 2021 01136 dated May 23, 2022.

(Continued)

*Primary Examiner* — Daniel Kessie
*Assistant Examiner* — Dru M Parries
(74) *Attorney, Agent, or Firm* — Patterson + Sheridan, LLP

(57) ABSTRACT

A grid side inverter system includes a grid side inverter, a phase locked loop controller arranged to determine a phase of a dq-frame dependent on a monitored grid voltage vector in the dq-frame and a reference grid voltage vector in the dq-frame, a current reference decision unit arranged to generate a reduction of at least one of an active and a reactive current reference, wherein a decision to generate the reduction is based on an electrical parameter relating to the phase difference of the monitored grid voltage vector and the PLL vector, a current controller arranged to determine control signals for the grid side inverter for controlling generation of active and reactive power to the grid dependent on the active and reactive current references and monitored active and a reactive grid currents in the dq-frame.

13 Claims, 5 Drawing Sheets

(56) References Cited

FOREIGN PATENT DOCUMENTS

| | | |
|---|---|---|
| WO | 2020019550 A1 | 1/2020 |
| WO | 2021209154 A1 | 10/2021 |

OTHER PUBLICATIONS

Taul Mads Graungaard et al., "Current Limiting Control with Enhanced Dynamics of Grid-Forming Converters During Fault Conditions," IEEE Journal of Emerging and Selected Topics in Power Electronics, IEEE, vol. 8, No. 2, Dated: Jul. 27, 2019, pp. 1062-1073.

Fakhari Moghaddam Arani Mohammadreza et al., "Analysis and Enhancement of the Artificial Bus Method for Successful Low-Voltage Ride-Through and Resynchronization," IEEE Transactions on Power Systems, IEEE, vol. 34, No. 3, Dated: May 1, 2019, pp. 1729-1739.

Lei Wang et al., "Design of a Thyristor Controlled LC Compenstor for Dynamic Reactive Power Compensation in Smart Grid," IEEE Transactions on Smart Grid, Dated: Jan. 1, 2017, pp. 409-417.

European Patent Office, Extended European Search Report for Application 22207184.7-1202 / 4191815 dated Nov. 5, 2023.

* cited by examiner

GRID SIDE INVERTER SYSTEM ARRANGED FOR CONTROLLING CURRENT INJECTION WHEN A PHASE LOCKED LOOP CONTROLLER IS MISALIGNED

FIELD OF THE INVENTION

The invention relates to power inverters, particularly control of grid connected power inverters.

BACKGROUND OF THE INVENTION

Electric power generating systems such as wind turbines and photovoltaic systems are supplying power to the electric grid via a power inverter. In case of severe grid faults the angle of the grid may be difficult to track or change significantly so that the inverter system may lose synchronism with the main grid and drift away from the grid frequency or so that the phase of the reference phase of the inverter system loses track of the phase of the voltage vector of the grid.

Such situations may lead to inappropriate power fluctuations which could generate undesired power exchange with the grid or could to tripping of the grid inverter.

Accordingly, it is a problem that the grid inverter system may operate unpredictably and cause undesired effects during situations where the inverter system such as the phase locked loop of the inverter system lack sufficient synchronisation with the voltage phase and/or frequency of the grid.

SUMMARY

It is an object of the invention to improve grid inverter systems so that one or more of the above mentioned problems generated due to lack of synchronisation with the grid frequency and phase are addressed.

In a first aspect of the invention there is provided a grid side inverter system comprising:
- a grid side inverter,
- a phase locked loop controller arranged to determine a phase of a dq-frame dependent on a monitored grid voltage vector in the dq-frame and a reference grid voltage vector in the dq-frame,
- a current reference decision unit arranged to generate a reduction of at least one of an active and a reactive current reference, wherein a decision to generate the reduction is based on an electrical parameter relating to a phase difference between a grid phase of the monitored grid voltage vector and the phase of the dq-frame,
- a current controller arranged to determine control signals for the grid side inverter for controlling generation of active and reactive power to the grid dependent on the active and reactive current references and monitored active and a reactive grid currents in the dq-frame.

Advantageously, by reducing the active and/or the reactive current reference when the electrical parameter indicates that the phase of the monitored grid voltage vector is not sufficiently synchronized with the output PLL dq frame, e.g. when there is a too large difference between the phase of the output PLL dq-frame and the measured phase of the grid voltage vector, the undesired effects of the inappropriately generated active and reactive currents such as inappropriate power exchange with the grid are reduced or eliminated since the magnitudes of the generated active and reactive currents are reduced.

For example, the decision to generate the reduction of at least one of the active and reactive current references may be based on a comparison of the electrical parameter with a predetermined value.

According to an embodiment, the generation of the reduction comprises reducing at least one of the active and reactive current references to a predetermined current reference, or references. For example, one or both of the predetermined current references may be set to zero.

The current reference decision unit may be arranged to output the active and reactive current references without the reduction, e.g. when there is no decision to generate the reduction, and to set the active and reactive current references to the predetermined active and reactive current references when there is decision to generate the reduction or in general dependent on the electrical parameter.

According to an embodiment, the current reference decision unit is configured to determine the predetermined active and reactive current references as a function of time so that at least one of the active and reactive current references is gradually reduced over a period of time. Accordingly, the current reference decision unit may be arranged to determine the reduction of at least one of active and reactive current references as a gradual reduction over a period of time, e.g. according to a predetermined ramping function.

According to an embodiment, the current reference decision unit is arranged to ramp the active and reactive current references to values determined dependent on measured active and reactive power production values and power production references at a moment in time after the decision to generate the reduction, where moment in time is determined based on the electrical parameter. Accordingly, when the grid voltage has recovered fully or partly, the active and reactive current references may be ramped back to the intended current references.

The grid side inverter system may comprise a grid voltage monitoring unit arranged to determine the electrical parameter dependent on the monitored grid voltage vector so that the electrical parameter provides a value relating to the phase difference between a grid phase of the monitored grid voltage vector and the phase of the dq-frame.

Further, the grid side inverter system may comprise reactive and active power controllers arranged to determine the active and reactive current references dependent on the measured reactive and active currents and the grid references for the reactive and active currents.

Additionally, the grid side inverter system may comprise a fault ride through switch arranged to determine the active and reactive current references dependent on the monitored grid voltage vector.

A second aspect of the invention relates to and electric power generating system comprising the grid side inverter system and a power source.

A third aspect of the invention relates to a method for controlling a grid side inverter connected to a power grid during a grid event such as a low voltage grid event, the method comprises
- determine a phase of a dq-frame dependent on a monitored grid voltage vector in the dq-frame and a reference grid voltage vector in the dq-frame,
- generate a reduction of at least one of an active and a reactive current reference, wherein a decision to generate the reduction is based on an electrical parameter relating to a phase difference between a grid phase of the monitored grid voltage vector and the phase of the dq-frame, determine control signals for the grid side inverter for controlling generation of active and reactive power to the grid dependent on the active and reactive current references and monitored active and a reactive grid currents in the dq-frame.

A fourth aspect of the invention relates to computer program product comprising software code adapted to control a grid side inverter system when executed on a data processing system, the computer program product being adapted to perform the method of the third aspect.

In general, the various aspects and embodiments of the invention may be combined and coupled in any way possible within the scope of the invention. These and other aspects, features and/or advantages of the invention will be apparent from and elucidated with reference to the embodiments described hereinafter.

BRIEF DESCRIPTION OF THE DRAWINGS

Embodiments of the invention will be described, by way of example only, with reference to the drawings, in which.

DETAILED DESCRIPTION OF AN EMBODIMENT

Figure 1A:
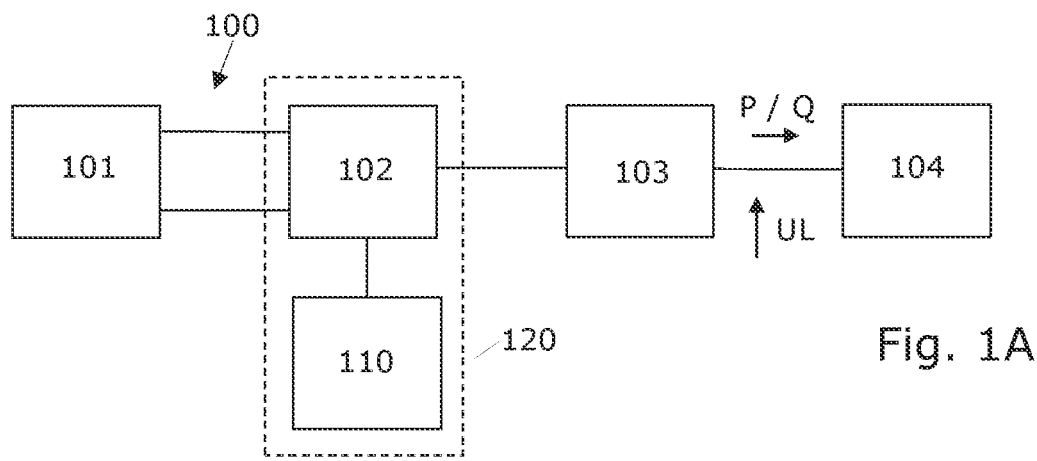
FIG. 1A shows an electric power generating system.

FIG. 1A shows an electric power generating system 100. The electric power generating system comprises a power source 101 which generates a DC power and supplies the DC power to a grid side inverter 102. The grid side inverter 102 converts the DC power to AC power which is injected to the grid 104, such as an electrical power distribution grid. The AC power from the inverter 102 may be filtered by a grid filter 103. Additionally, transformers may be included, e.g. between the inverter 102 and the grid filter. The filter may comprise filter inductors and filter capacitors to provide waveform smoothening of the voltage output of the grid side inverter 102.

While the power from the grid side inverter 102 is supplied to the grid 104, an intermediate network may be arranged to connect the output of the electric power generating system, such as wind turbines, to the grid. Such an intermediate network may comprise a power line such as a medium voltage network which connects the power generating system or a plurality of systems with the grid 104 such as a high voltage transmission network via a transformer.

Herein the grid 104 can be any of a distribution grid, a transmission grid, a medium voltage network, a high voltage grid or other electrical grid to which the output of the grid filter 103 is connected.

The power generating system 100 may be a photovoltaic system, a wind turbine generator, a battery storage system a fuel cell system or any other power generating system which generates a DC output power.

UL is the grid voltage vector in a dq frame coordinate system measured between the output of the grid filter and the grid 104, i.e. a coordinate system that rotates with the frequency of the grid voltage. P and Q are active and reactive power supplied to the grid.

Figure 1B:
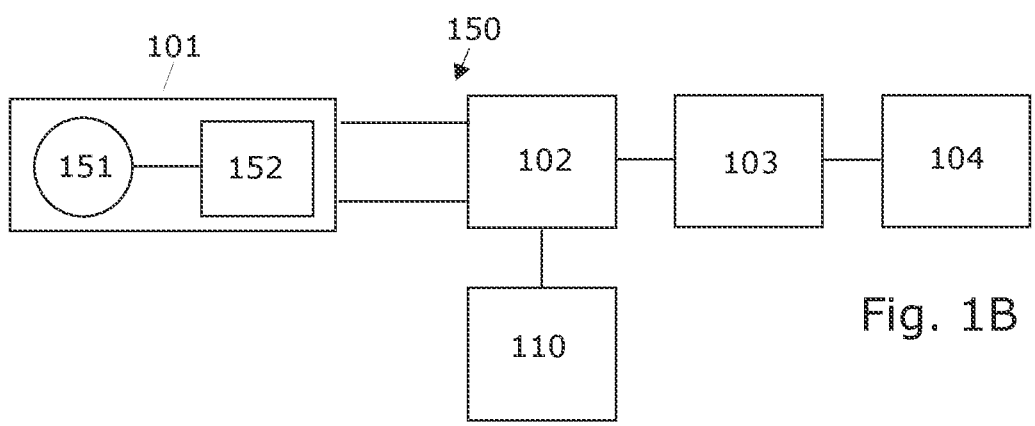
FIG. 1B shows an example where the power generating system is a wind turbine.

FIG. 1B shows an example where the power generating system 100 is a wind turbine 150. The power source 101 of the wind turbine 150 comprises the generator 151 of the wind turbine and a machine side converter 152 arranged to convert the AC power from the generator into DC power.

Figure 1C:
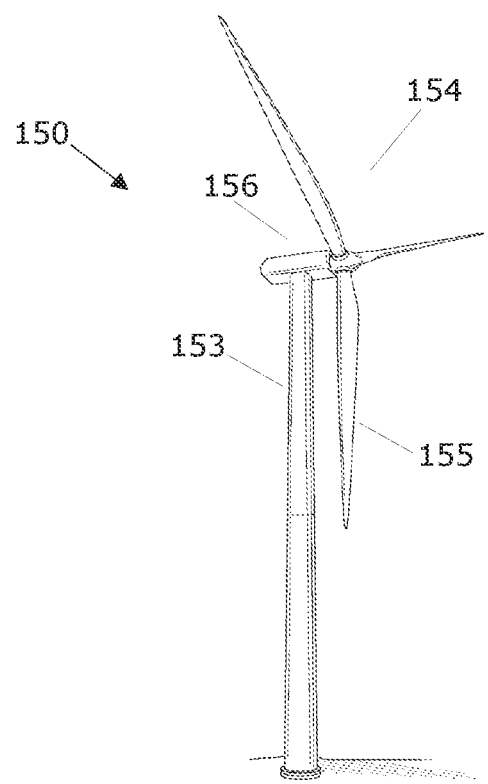
FIG. 1C shows a wind turbine.

FIG. 1C shows a wind turbine 150 comprising a tower 153 and a rotor 154 with at least one rotor blade 155, such as three blades. The rotor is connected to a nacelle 156 which is mounted on top of the tower 153 and is arranged to drive the generator 151 situated inside the nacelle via a drive train. The drive train comprises the shaft connecting the rotor 154 with the gearbox or the generator. The rotor 154 is rotatable by action of the wind. The wind induced rotational energy of the rotor blades 155 is transferred via a shaft to the generator. Thus, the wind turbine 150 is capable of converting kinetic energy of the wind into mechanical energy by means of the rotor blades and, subsequently, into electric power by means of the generator. The wind turbine further comprises the machine side converter 152 and the grid side inverter 102.

The power generating system 100 further comprises an inverter control system 110 arrange to control the grid side inverter 102 to supply desired amounts of active and reactive power to the grid 104.

A grid side inverter system 120, as herein defined, comprises the grid side inverter 102 and the inverter control system 110.

Figure 2:
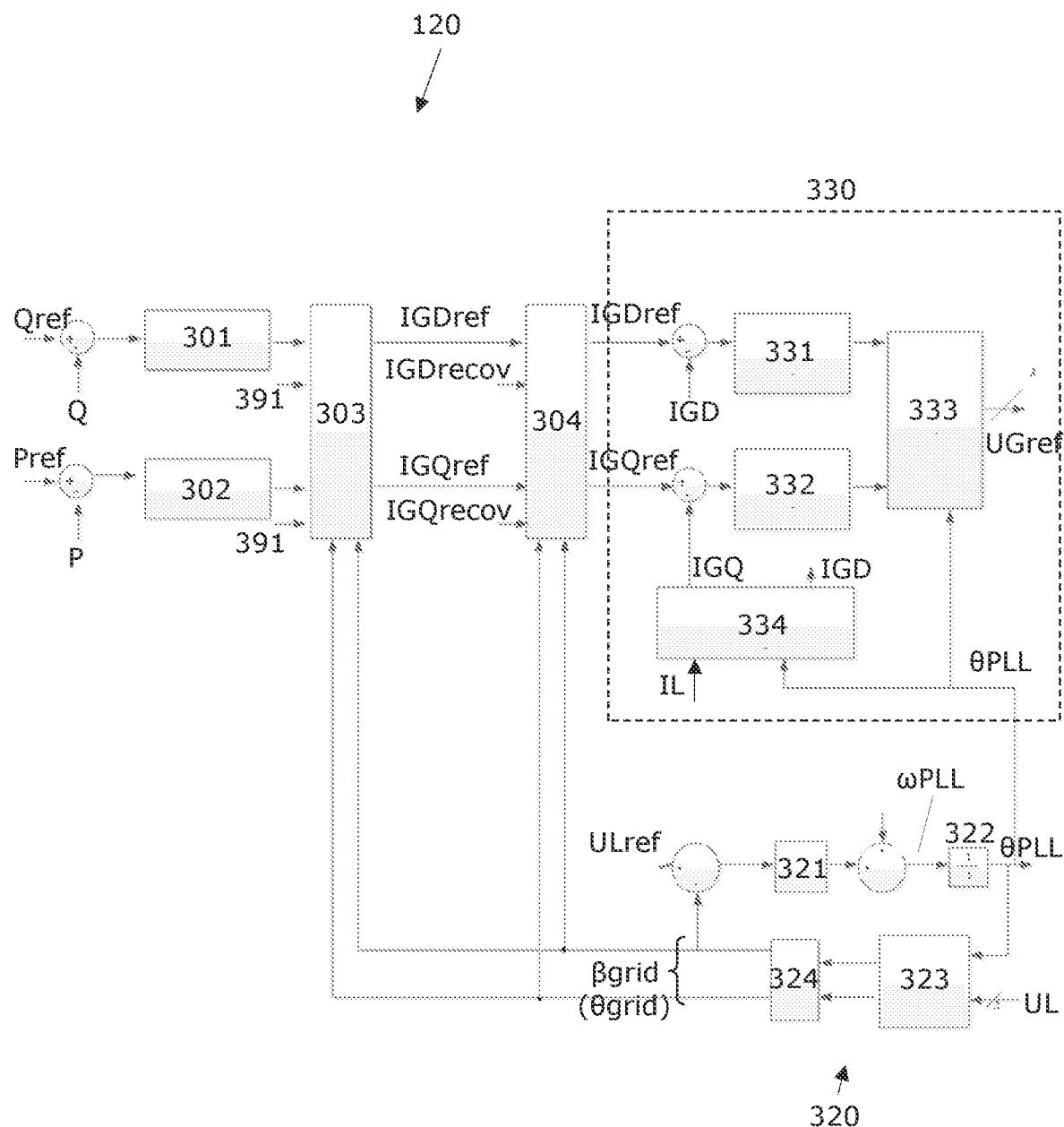
FIG. 2 shows an example of a grid side inverter system.

FIG. 2 shows an example of a grid side inverter system 120. The grid side inverter system may be arranged in different ways and in other examples without some of the components illustrated and in other configurations with other or alternative components. The description herein focuses on configurations according to various embodiments and examples of the present invention.

FIG. 2 shows that the grid side inverter system 120 comprises active and reactive power controllers 301, 302 arranged to generate current control references IGQref, IGDref dependent on power references Qref, Pref and measured active and reactive power P, Q so as to minimize the difference between the power references and measured grid power.

The current control references IGQref, IGDref are determined as references for controlling the grid inverter 102, e.g. via a pulse width modulator (PWM) which determines switching signals based on IGQref, IGDref for controlling the switching elements such as IGBT transistors of the grid inverter 102.

A fault ride through unit 303 is provided to modify the current control references IGQref, IGDref in case of a grid voltage fault where the grid voltage increases or decreases above or below certain voltage thresholds. In case of low grid voltages the fault ride through unit 303 is configured to determine the current control references IGQref, IGDref so that the level of the reactive current supplied to the grid is increased, and vice versa in case of high grid voltages. In a situation with voltage errors, the fault ride through unit 303 may be configured to determine the current control references IGQref, IGDref dependent on references 391 which may depend on the grid voltage.

In this example, the fault ride through unit 303 receives as input, voltages ULD and ULQ being the projections of the grid voltage vector UL on the d and q axes in the dq coordinate system. Based on the voltages ULD, ULQ, the fault ride through unit 303 can decide and determine a possible change of the active and reactive current control references IGQref, IGDref to assist the grid in restoring the desired grid voltages.

Clearly, the fault ride through unit 303 may be provided with other input than the grid voltages ULD and ULQ. For example, the fault ride through unit 303 may be provided with the amplitude of the grid voltage vector UL, or other values relating to the grid voltage.

In case the grid voltage is within acceptable limits the current control references IGQref, IGDref is outputted without modifications by the fault ride through unit 303.

The fault ride through unit 303 is optional and may be omitted in the grid side inverter system 120 or could be integrated in the system in alternative ways.

A current reference decision unit 304 is provided to generate a reduction of at least one of the active and a reactive current reference IGQref, IGDref dependent on an electrical parameter βgrid which is determined so that it relates to the grid phase θgrid of the monitored grid voltage vector UL, such as relates to the phase difference Δθ between the grid phase θgrid and the PLL phase θPLL, i.e. Δθ=θPLL-θgrid.

The PLL phase θPLL is the angle or phase of a rotating dq-frame and is determined by the phase locked loop controller 320.

The electrical parameter βgrid may comprise the grid voltage components ULD and ULQ from which the phase of the grid θgrid can be determined, e.g. by the current reference decision unit 304. Or one or more of the grid voltage components ULD and ULQ, such as the d component ULD, may be used directly by the current reference decision unit 304 since the d component ULD indicates the magnitude of the phase misalignment Δθ=θPLL-θgrid. As another example, the electrical parameter βgrid may comprise the amplitude of the grid voltage vector UL and its phase θgrid.

The fault ride through unit 303 and the current reference decision unit 304 may be provided with the same electrical parameter βgrid, e.g. as illustrated, or they may be provided with different parameters.

Thus, the current reference decision unit 304 may determine a reduction of one or both of the active and a reactive current references IGQref, IGDref. The reduction of the active and a reactive current references IGQref, IGDref is determined to prevent generation of inappropriate output power values P, Q, such as negative values which may lead to unwanted power exchange with the grid.

The current reference decision unit 304 may output the input values of the inputted active and reactive current control references IGQref, IGDref without any reduction.

Alternatively, depending on the electrical parameter βgrid, e.g. if the grid phase θgrid is above a threshold or if the magnitude of ULD is above a threshold, the current reference decision unit 304 may set the active and reactive current references IGQref, IGDref to predetermined active and reactive current references IGQrecov, IGDrecov.

As shown the predetermined active and reactive current references IGQrecov, IGDrecov may be provided as input to the current reference decision unit 304.

A decision to reduce one or both of the active and reactive current references IGQref, IGDref may also be dependent on the actual value of the current references IGQref, IGDref. Thus, if one or both of the current references is below a predetermined threshold, IGQref and/or IGDref may not be reduced. For example, if IGQref is already low, possibly lower than IGQrecov, there may be no reason to change IGQref.

Thus, if a decision is taken to generate a reduction of one or both of the current references IGQref, IGDref, the reduction comprises reducing at least one of the active and reactive current references IGQref, IGDref to a predetermined current reference which consequently is numerically smaller than the respective numeric values of the present active and reactive current references IGQref, IGDref supplied to the current reference decision unit 304.

The predetermined active and reactive current references IGQrecov, IGDrecov may be fixed values. E.g. one or both of IGQrecov, IGDrecov may be zero.

Alternatively or additionally, the current reference decision unit 304 may be configured to determine the predetermined active and reactive current references IGQref, IGDref as a function of time, e.g. according to a ramping function or other function which decreases over a time interval, so that at least one of the active and reactive current references IGQref, IGDref is gradually reduced over a period of time.

Accordingly, the reduction of the current references IGQref, IGDref may be generated as an instantaneous change or gradually over time.

The grid side inverter system 120 may further comprise a grid voltage monitoring unit 324 arranged to determine the electrical parameter βgrid dependent on the monitored grid voltage vector UL.

The grid side inverter system 120 further comprises a phase locked loop controller (PLL) 320 arranged to determine a filtered version of the grid angle θgrid. The phase θPLL is the angle of the rotating dq-frame or dq-coordinate system, rotating with the frequency ωgrid, relative to a fixed frame. The grid side phase locked loop controller is configured to adjust the phase θPLL so that the phase difference between the measured grid angle θgrid and the PLL output angle θPLL is minimized. Thus, the phase locked loop controller 320 tracks the phase of the grid voltage vector UL so that the phase difference (θPLL-θGrid) is minimized, or to achieve a desired a phase difference (θPLL-θGrid) so that the rotation frequency of the dq-frame ωPLL approaches the grid frequency ωgrid.

I this example, the phase locked loop controller (PLL) 320 is configured to remove the difference between a zero reference input and the d-component ULD of the grid voltage vector UL. This difference is processed by a PI controller 321 which at least integrates the difference over time. The output from the PI controller is combined, e.g. added, with the rated grid frequency ωrated and integrated by the integration function 322 to generate the phase PLL of the rotating dq-frame. The abc-to-dq transformation element 323 transforms the measured grid voltages UL, here three voltages ULa, ULb, ULc in a three phase system, into the dq frame representation of the grid voltage vector UL. The moving average of the projections of the grid voltage vector UL onto the d and q axes is determined by the grid voltage monitoring unit 324, which in this example is configured to determine the electrical parameter βgrid as the averaged projections ULD, ULQ.

Accordingly, in this example, the PLL is a sort of voltage controller, which tracks the grid angle by controlling the d-axis voltage towards zero and in this way determines the angle of the grid. The value of the grid d- and q-axis voltages contains information about how good or bad the PLL is aligned to the grid and the d and q axis voltages are fed to the current reference decision unit 304 for decision taking as described above.

The grid side inverter system 120 further comprises a current controller 330 arranged to determine control signals UGref for the grid side inverter for controlling generation of active and reactive power P, Q dependent on the active and reactive current references IGQref, IGDref and monitored active and a reactive grid currents IGQ, IGD in the dq-frame.

In this example, the current controller 330 determines the respective differences between the active and reactive current references IGQref, IGDref and the monitored active and a reactive grid currents IGQ, IGD. The active and a reactive grid currents IGQ, IGD are determined from monitored grid currents IL by the abc-to-dq transformation element 334. The differences are supplied to controllers 331, 332, such as PI controllers, which determine control signals in the dq-frame which are transformed by the dq-to-abc transformation element 333 to control signals UGref in the abc frame. The control signals UGref, one for each grid phase, is supplied to a pulse width modulator (not shown) which determines control signals for controlling the switching elements of the grid inverter 102.

As illustrated, the determined phase PLL of the rotating dq-frame is supplied to dq transformation elements 323, 333, 334.

Figure 3:
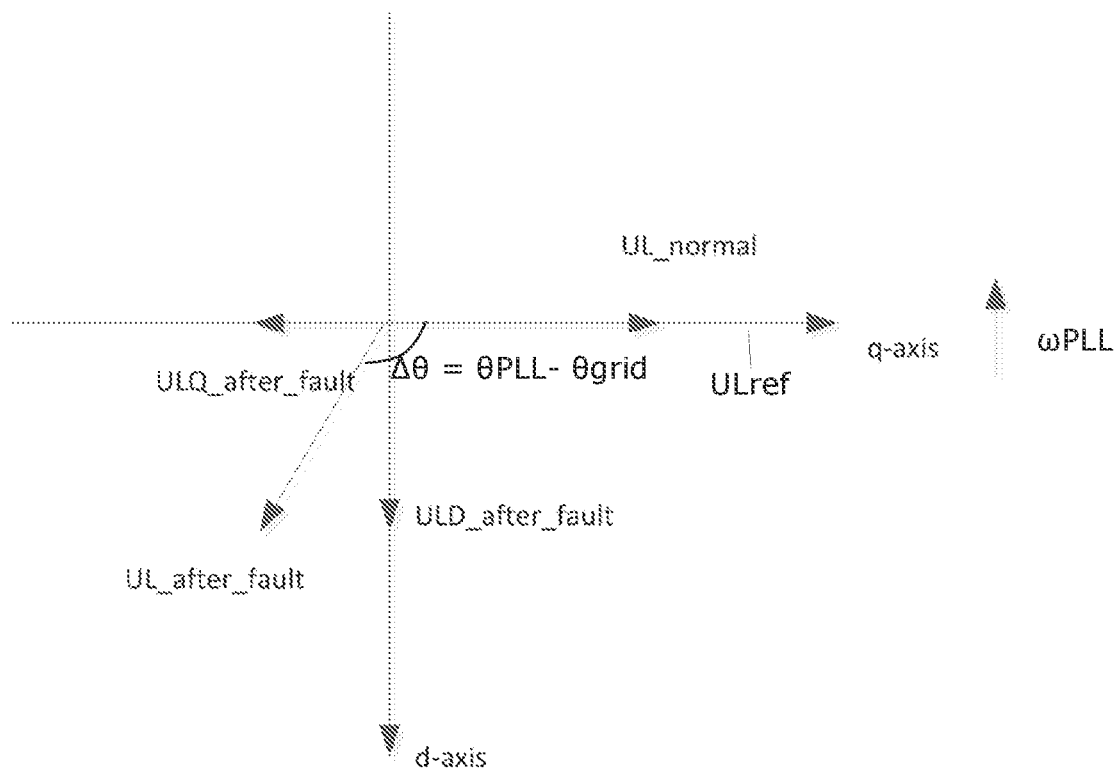
FIG. 3 shows the vector diagram of the grid voltage vector UL in a dq frame rotating with frequency ωPLL.

FIG. 3 shows the vector diagram of the grid voltage vector UL in a dq frame rotating with frequency ωPLL. In a normal situation where the phase locked loop controller 320, in this exemplary example, correctly tracks the grid voltage vector UL, the q axis is aligned with UL.

In case of severe grid faults the angle of the grid egrid can be difficult or impossible to track and as a consequence of that the electrical generating units may drift away from the main grid frequency. When the grid fault is removed in the grid and the grid voltage is being restored the electrical generating units has to realign to grid voltage and remove the drift that may have taken place during the fault.

In the realignment process to new grid conditions, the grid inverter 102 can be the source of high power fluctuations leading to tripping of the inverter or could generate problems to achieve license to operate.

The grid side inverter system 120 may reduce such power oscillations and reduce the risk of the causing the grid inverter 102 to trip during the realignment process.

In certain conditions where the phase PLL of the PLL is misaligned with the grid voltage vector UL, the rotating dq-current controllers 331, 332 can be misaligned towards the grid and a current intended for positive active current IGQ may become a reactive current or negative active current. During such misaligned conditions, the active and/or reactive current reference IGQref, IGDref are advantageously adjusted downwards or towards zero by the current reference decision unit 304. In this example the phase difference (θPLL-θgrid) has reached approximately −120 degrees, indicating a very misaligned PLL.

FIG. 3 shows a situation where the phase θPLL is misaligned with the grid voltage UL_after_fault. Thus, since the current controllers 331, 332 are still effective at controlling the current when the phase θPLL is misaligned, the current controllers may generate unintended active and reactive currents.

With the reduction of the current references IGQref, IGDref the phase locked loop controller 320 is given time to gain track with the grid voltage angle again.

After the phase locked loop controller 320 has obtained a more correct tracking of the grid voltage vector UL or at least reduced the phase error (θPLL-θGrid) to a predetermined level the active and/or reactive current references IGQref, IGDref can be ramped up to the intended values again.

Figure 4:
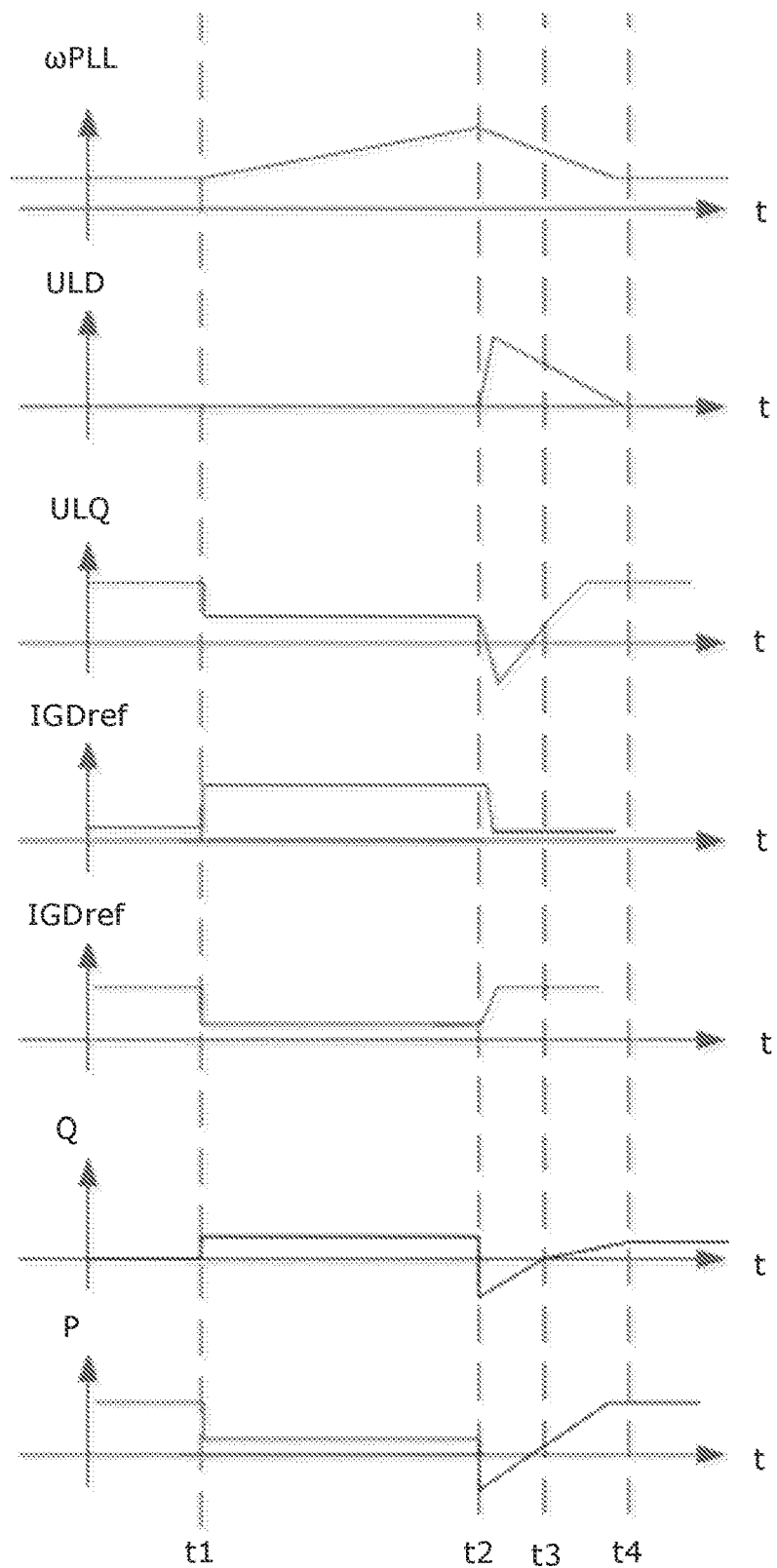
FIG. 4 shows the operation of a grid side inverter system without the current reference decision unit.

FIG. 4 shows the operation of a grid side inverter system without the current reference decision unit 304.

At time=t1 a grid fault occurs which in this case causes a grid voltage drop, i.e. a drop in ULQ. In response, the reactive current reference IGDref is increased and the active current reference IGQref is decreased. The increase in the reactive current reference may have been determined by the fault ride through unit 303. The reactive current Q increases and the active power P decreases in response to the change in the current references.

The frequency ωPLL of the PLL 320 is in this case increasing and could indicate a grid frequency change or that the PLL 320 loses tracking of the grid voltage vector UL.

At time=t2 the grid voltage recovers. Due to the misalignment of the PLL, i.e. the phase difference (θPLL-θGrid) may have increased to cause a severe misalingment as shown in FIG. 3, the voltage component ULD increases and the voltage component ULQ decreases to a negative value. Since the PLL 320 is misaligned to the grid the current controllers 331, 332 cause injection of negative active and reactive power P and Q. After t2, the positive d-axis voltage component ULD is regulated towards zero by the PLL and hence slowing down the PLL. The q-axis voltage component ULQ is large negative and is due to the PLL action controlled towards normal alignment with the q-axis.

At time=t3, ULQ has become positive but is still increasing and ULD is still approaching a zero value. The active and reactive power P and Q have reached zero values but are still increasing.

At time=t4, the grid voltage values ULQ, ULD and the power values P, Q have returned to the desired values.

The large negative values of the active and reactive powers P and Q are in most cases not wanted and could lead to tripping of the grid inverter 102, i.e. a situation where the grid inverter 102 will be disconnected from the grid connection.

Figure 5:
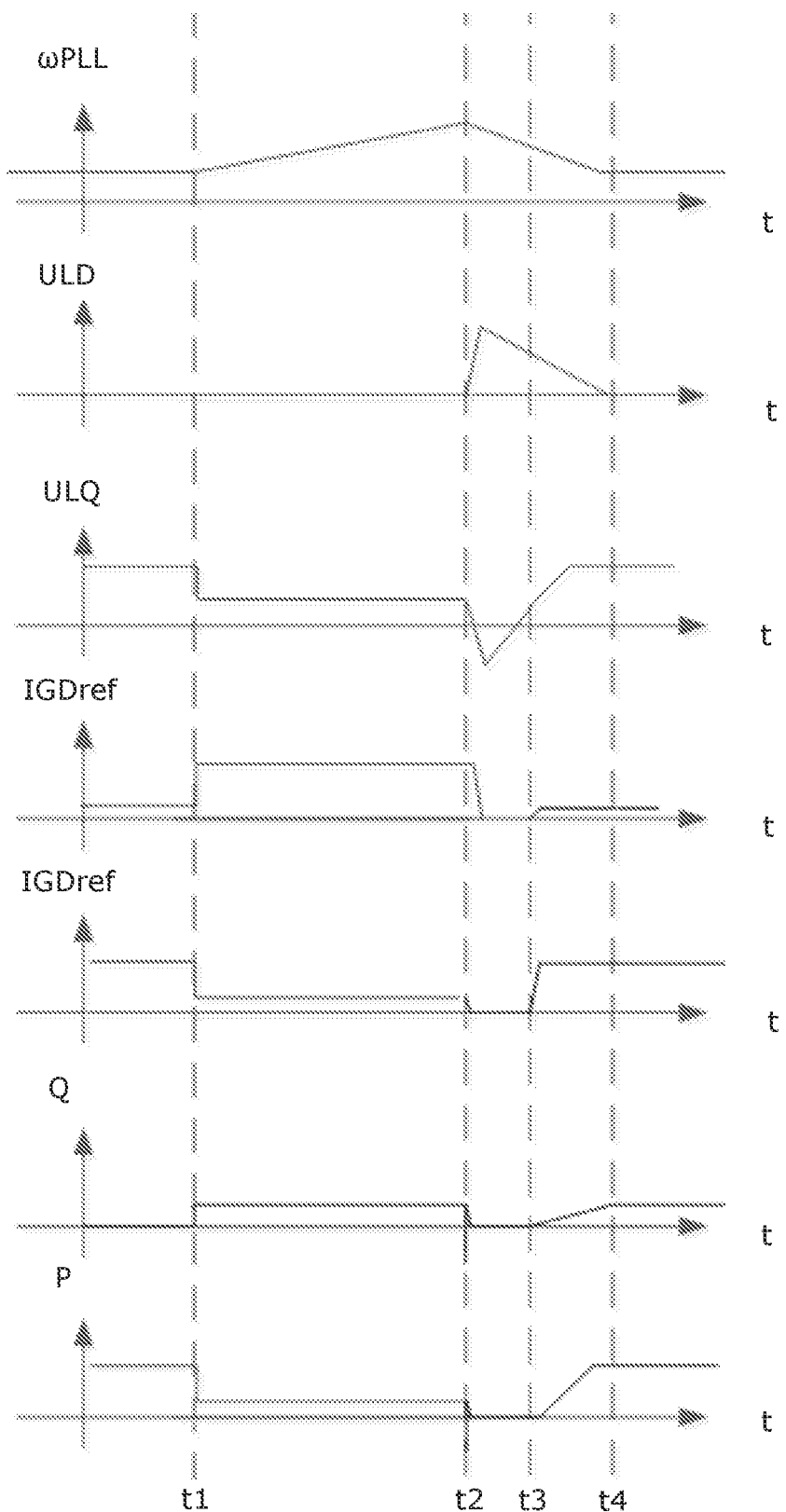
FIG. 5 shows the operation of a grid side inverter system with the current reference decision unit.

FIG. 5 shows the operation of a grid side inverter system 120 according to embodiments and examples of the invention, i.e. where the system includes the current reference decision unit 304.

In comparison with FIG. 4, FIG. 5 shows that shortly after t2, the current reference decision unit 304 has taken the decision to lower the current references IGDref, IGQref due to the large negative q axis voltage ULQ and/or the positive d axis value ULD. In this example the current references are reduced to zero. That is, with reference to the general explanation of FIG. 2, the current reference decision unit 304 has taken the decision to lower the current references based on the electrical parameter βgrid.

As indicated in FIG. 5, the current references IGDref, IGQref are not reduced instantaneously, but are ramped down to zero. Thus, the current reference decision unit 304 may be configured to determine the reduction of at least one of active and reactive current references IGQref, IGDref as a gradual reduction over a period of time, e.g. according to a ramping function.

At t3, the q axis voltage component has increased to a positive value so that the phase PLL is below 90 degrees or above −90 degrees. Therefore, the current reference decision unit 304 has taken the decision to resume the normal current controller references and therefore starts ramping up the current references IGDref, IGQref.

As indicated in FIG. 5, the current references IGDref, IGQref are not increased or restored to the intended values instantaneously, but are ramped up to the presently determined current references IGDref, IGQref, i.e. as determined by the power controllers 301, 302. Accordingly, the current reference decision unit 304 may be configured to determine the increase of at least one of active and reactive current references IGQref, IGDref as a gradual increase over a period of time, e.g. according to a ramping function, when the electrical parameter βgrid indicates that the PLL has reduced the phase difference (θPLL-θGrid) to an acceptable level. Thus, the current reference decision unit 304 may ramp the intended active and reactive current references IGQref, IGDref at a moment in time after the decision to generate the reduction, where moment in time is determined based on the electrical parameter βgrid.

At time=t4, the grid voltage values ULQ, ULD and the power values P, Q have returned to the desired values.

FIG. 5 shows that the undesired values of the active and/or reactive power values P, Q are avoided by reducing the current references IGDref, IGQref when the electrical parameter βgrid indicates a large misalignment of the PLL, i.e. a large phase error between θPLL and θGrid. Thus, unintended power exchange with the grid may be avoided or at least limited.

What is claimed is:

1. A grid side inverter system comprising:
    a grid side inverter;
    a phase locked loop controller arranged to determine a phase of a dq-frame dependent on a monitored grid voltage vector in the dq-frame and a reference grid voltage vector in the dq-frame;
    a current reference decision controller arranged to generate a reduction of at least one of an active and a reactive current reference, wherein a decision to generate the reduction is based on an electrical parameter relating to a phase difference between a grid phase of the monitored grid voltage vector and the phase of the dq-frame;
    a current controller arranged to determine control signals for the grid side inverter for controlling generation of active and reactive power to the grid dependent on the active and reactive current references and monitored active and a reactive grid currents in the dq-frame; and
    wherein the generation of the reduction comprises reducing at least one of the active and reactive current references to a predetermined current reference or references.

2. A grid side inverter system according to claim 1, wherein the current reference decision controller is arranged to:
    output the active and reactive current references without the reduction; or
    to set the active and reactive current references to the predetermined active and reactive current references.

3. A grid side inverter system according to claim 1, wherein at least one of the predetermined active and reactive current references is zero.

4. A grid side inverter system according to claim 1, wherein the current reference decision controller is configured to determine the predetermined active and reactive current references as a function of time so that at least one of the active and reactive current references is gradually reduced over a period of time.

5. A grid side inverter system according to claim 1, wherein the current reference decision controller is arranged to determine the reduction of at least one of active and reactive current references as a gradual reduction over a period of time.

6. A grid side inverter system according to claim 1, wherein the decision to generate the reduction of at least one of the active and reactive current references is based on a comparison of the electrical parameter with a predetermined value.

7. A grid side inverter system according to claim 1, wherein the current reference decision controller is arranged to ramp the active and reactive current references to values determined dependent on measured active and reactive power production values and power production references at a moment in time after the decision to generate the reduction, where moment in time is determined based on the electrical parameter.

8. A grid side inverter system according to any of the preceding claim 1 comprising:
    a grid voltage monitoring unit arranged to determine the electrical parameter dependent on the monitored grid voltage vector so that the electrical parameter provides a value relating to the phase difference between the grid phase of the monitored grid voltage vector and the phase of the dq-frame.

9. A grid side inverter system according to claim 1, comprising:
    reactive and active power controllers arranged to determine the active and reactive current references dependent on the measured reactive and active currents and the grid references for the reactive and active currents.

10. A grid side inverter system according to claim 1, comprising:
    a fault ride through switch arranged to determine the active and reactive current references dependent on the monitored grid voltage vector.

11. An electric power generating system comprising:
    a grid side inverter system, comprising:
        a grid side inverter;
        a phase locked loop controller arranged to determine a phase of a dq-frame dependent on a monitored grid voltage vector in the dq-frame and a reference grid voltage vector in the dq-frame;
        a current reference decision controller arranged to generate a reduction of at least one of an active and a reactive current reference, wherein a decision to generate the reduction is based on an electrical parameter relating to a phase difference between a grid phase of the monitored grid voltage vector and the phase of the dq-frame;
        a current controller arranged to determine control signals for the grid side inverter for controlling generation of active and reactive power) to the grid dependent on the active and reactive current references and monitored active and a reactive grid currents in the dq-frame;
        a power source; and
        wherein the generation of the reduction comprises reducing at least one of the active and reactive current references to a predetermined current reference or references.

12. A method for controlling a grid side inverter connected to a power grid during a grid event such as a low voltage grid event, the method comprising:
    determining a phase of a dq-frame dependent on a monitored grid voltage vector in the dq-frame and a reference grid voltage vector in the dq-frame;
    generating a reduction of at least one of an active and a reactive current reference, wherein a decision to generate the reduction is based on an electrical parameter relating a phase difference between a grid phase of the monitored grid voltage vector and the phase of the dq-frame;
    determining control signals for the grid side inverter for controlling generation of active and reactive power to the grid dependent on the active and reactive current references and monitored active and a reactive grid currents in the dq-frame; and generating the reduction further comprising reducing at least one of the active and reactive current references to a predetermined current reference or references.

13. A computer program product comprising code which, when executed by one or more computer processors, perform an operation to control a grid side inverter system, the operation comprising:

determining a phase of a dq-frame dependent on a monitored grid voltage vector in the dq-frame and a reference grid voltage vector in the dq-frame;

generating a reduction of at least one of an active and a reactive current reference, wherein a decision to generate the reduction is based on an electrical parameter relating a phase difference between a grid phase of the monitored grid voltage vector and the phase of the dq-frame;

determining control signals for the grid side inverter for controlling generation of active and reactive power to the grid dependent on the active and reactive current references and monitored active and a reactive grid currents in the dq-frame; and generating the reduction further comprising reducing at least one of the active and reactive current references to a predetermined current reference or references.

* * * * *